United States Patent Office 2,695,876
Patented Nov. 30, 1954

2,695,876

PREVENTION OF CORROSION OF IRON BY AQUEOUS BRINES

Robert E. Fariss, Houston, Tex., assignor to The Texas Company, New York, N. Y., a corporation of Delaware No Drawing. Application April 27, 1951,
Serial No. 223,433

11 Claims.  (Cl. 252—8.55)

The present invention relates to inhibiting the corrosion of ferrous metals in contact with aqueous solutions and is more particularly concerned with protecting metals such as iron and steel against corrosion by aqueous solutions such as subsurface brines, ground waters and similar solutions met with in industrial practice.

The present invention has particular application to the handling of corrosive subsurface aqueous brines, such for example as produced water which usually accompanies the crude hydrocarbon petroleum withdrawn from a producing subsurface formation through a producing well bore. The well bore is normally lined with a casing and finished with steel production tubing, and is usually fitted with pumps and other production adjuncts similarly constructed of ferrous material.

All of this, as well as related surface equipment, in contact with the flow of brine, is therefore constantly subject to corrosive influence. The aqueous effluent from the well may be an acid brine, which is excessively corrosive, but in any case the corrosive effect is serious and objectionable.

The replacement of corroded steel structure is always costly, and at subsurface locations, involves a high order of replacement expense which places a serious economic burden upon production from formations containing corrosive brines.

In accordance with the present invention, it has been discovered that substantially complete corrosion protection of steel and iron from aqueous solutions may be realized by incorporating a small amount of zinc chromate in the brine prior to contact with the ferrous metal surfaces, which it is necessary to protect.

This is particularly surprising, inasmuch as the water solubility of zinc chromate is so slight that it is generally classified as being insoluble, as is indicated in the "Handbook of Chemistry" (Lange). Actually, the reported solubility is only about 130 parts per million. It has been found, in accordance with the present invention, that even this small amount is far in excess of the proportion required to afford substantially complete protection. For example, as low as 10% of the amount of the maximum amount of zinc chromate which can be dissolved completely inhibits the corrosion of iron and steel surfaces in a strongly corrosive brine, under conditions of continuous alternate exposure to air and brine and even under acid conditions. Manifestly, at extent of dilution contemplated, a small quantity of the inhibitor is effective to treat large volumes of aqueous solution.

Therefore, in accordance with the present invention, the corrosive flow of brine, prior to contact with the metallic iron surfaces to be protected, is injected with a small amount of zinc chromate. Thereafter, it may be passed continuously in contact with steel conduit and equipment for long periods of time without appreciably corroding the metal surfaces.

For example, solid zinc chromate may be injected directly in the stream of brine in small amounts, preferably, for example, about 5–20 parts per million. This method is effective where the stream is flowing and relatively turbulent or agitated; so, also, the brine may be permitted to percolate over a bed of granulated zinc chromate. Alternatively, the solid particle compound may be supplied to a reservoir of the aqueous brine where contact is maintained for a sufficient time to assure solution of the inhibitor in the brine. Thereafter, the brine is passed through the ferrous conduits or equipment without detrimental corrosion thereof.

On the other hand, the zinc chromate may advantageously be dissolved in water, to form a concentrated solution which is conveniently injected into the brine in the proper amount.

The zinc chromate may be produced, in situ, in the corrosive liquid by separately injecting solutions of readily soluble zinc and chromate salts, as for example, solutions of zinc chloride and potassium chromate. An advantage of this treatment is that a slight excess will result in a fine precipitate of zinc chromate which will flow with the aqueous stream and afford continuous and persistent protection.

In the production of petroleum hydrocarbons from a subsurface formation through a well bore producing a stream of formation water, the inhibitor is preferably injected continuously into the bottom of the well hole through a pipe or through the annular space about the production tubing. As above indicated, it is only necessary to effect solution of relatively minute amounts of the chromate in the aqueous brine prior to contact with metallic iron. Thereafter, a high order of corrosion protection prevails, obviating the costly replacement of production tubing and the like.

In order to illustrate the advantages of the present invention, zinc chromate was prepared by reacting a solution of zinc chloride with potassium chromate at atmospheric temperature to form the characteristic yellow precipitate. The precipitate was filtered off and washed thoroughly to remove all traces of soluble salts.

The quantitative effect of the zinc chromate, as regards inhibiting the corrosion of ferrous metals was determined as follows. An air-saturated brine solution containing about 52,000 parts per million of sodium chloride was prepared, having a pH of 6.2–6.8.

A portion of the brine was saturated with zinc chromate by allowing it to stand in contact with solid particle precipitate for an extended period of time and then filtering out the excess solid.

Additional test samples were prepared by mixing portions of the original brine with several samples of the zinc chromate-saturated brine to give dilution factors of 2:1, 5:1 and 10:1, respectively. Several samples were thus prepared, namely, the brine saturated with zinc chromate, and three brines containing lesser amounts of zinc chromate equal, respectively, to 50%, 20% and 10% of the saturation amount. Each of the brine solution samples used in this test had a pH of 6.2–6.8.

These several samples were subjected to a quantitative corrosion test in cylindrical glass containers of 125 mls. capacity, each containing a mild steel wire coil of about 4.6 grams in weight and $\frac{1}{16}''$ diameter. About 50 mls. of brine sample were placed in each of the glass containers. During the period of test, the glass containers were moved continuously to alternately subject the steel samples to brine immersion and air contact.

At the completion of the test period, the loss in weight of the test coupons was determined as a measure of the degree of corrosion.

In one typical series of tests carried out in this manner, the results were as follows:

| Solution Tested | Time of Test | | Weight Loss, Grams |
| --- | --- | --- | --- |
| | Hours | Minutes | |
| Brine (Blank) | 39 | 40 | .0480 |
| Brine 100% saturated with zinc chromate | 39 | 50 | None |
| Brine 50% saturated with zinc chromate | 40 | 10 | None |
| Brine 20% saturated with zinc chromate | 40 | 25 | None |
| Brine 10% saturated with zinc chromate | 40 | 40 | None |

The foregoing table shows that the corrosive effect of the brine is completely inhibited by relatively minute quantities of zinc chromate of the order of 10–13 parts per million. It is to be noted, moreover, that there is no measurable decrease in the effect with decreasing concentration of zinc chromate, from which it appears that even traces thereof exert a profound inhibiting effect.

Yet further tests carried out with quite acid brines reveal, quantitatively, a protective effect which closely approaches absolute. For example, in tests as above on a similar brine saturated with zinc chromate and adjusted to a pH of 3.5, the weight loss of the sample was not greater than .0008 gram. Actually it has been found that the present inhibitor is effective in brines or other aqueous solutions of substantial acidity down to a pH of about 3.0, in which the corrosive effect is normally quite severe.

As above intimated, the present invention is applicable in general, to the protection of ferrous metals from the corrosive effect of aqueous liquids which are compatible with zinc chromate. Liquids which are "compatible with zinc chromate" are those in which zinc chromate is capable of dissolving as such, and, therefore, the term excludes aqueous solutions containing reagents in amounts which are capable of preventing the zinc chromate from existing in solution.

Aqueous solutions containing $H_2S$, such as the frequently encountered, so-called sulfide brines are preferably treated to remove the $H_2S$ or lower it to a negligible level by any of the currently available methods.

It is preferred, however, to effect this result with brines containing small amounts of $H_2S$ by adding a soluble cadmium salt, such as cadmium chloride. Thus, in the case of brines containing about 100–150 p. p. m. of $H_2S$, cadmium chloride is added in a concentration effective to react with the $H_2S$. Since cadmium sulfide has a substantially lower solubility than zinc sulfide, the zinc chromate is thereby, in effect, protected.

For example, in the case of low sulfide brines containing about 125 p. p. m. $H_2S$, the amount of cadmium chloride added may be about ⅓ lb. per barrel of brine to be treated. The treatment is advantageously made prior to or simultaneously with the addition of the zinc chromate inhibitor. For example, the cadmium salt may be mixed with the zinc chromate being added to the aqueous liquid under treatment.

In general, therefore, the present invention is applicable to the protection of ferrous metals from corrosion by aqueous solutions of inorganic salts which are compatible with zinc chromate. It is likewise applicable in the case of brines as above, or of ordinary aqueous solutions of acids, both inorganic and organic, which have a pH of not less than about 3.0. In the case of salt solutions substantial inhibition of corrosion occurs irrespective of the concentration of the solution in question, being effective in the case of dilute brines as well as substantially saturated solutions.

Advantageously, in protecting against corrosion by aqueous solutions having a pH below about 5.0, an excess of chromate ions is supplied, as for example, by supplementing the stoichiometric zinc chromate addition with a substantial amount of an alkali or alkaline earth metal chromate. This modification follows from the fact that a diminution of the usual corrosion inhibiting effect is fequently experienced in the case of acid solutions of pH less than about 5.0 when stoichiometric proportions of zinc and chromate ions are present. This is believed to be due to the conversion of some of $(CrO_4^=)$ ions to $(HCrO_4^-)$ ions in acid solution. By furnishing an excess of chromate ions relative to zinc ions, the coexistence of zinc and chromate ions in the desired proportion results. In any event, a substantial addition of the supplementary chromate salt results in a high degree of protection against corrosion. For example, the supplementary chromate salt may be added in an amount ranging from 10–50 per cent in excess of the stoichiometric amount.

It is to be particularly noted that the term aqueous solutions as used herein include naturally occurring waters, which may be very dilute as regards their salt content. Such, for example, are typical ground or river waters, which, however, are generally highly corrosive with respect to ferrous metals.

Obviously, many modifications and variations of the invention as hereinbefore set forth may be made without departing from the spirit and scope thereof, and therefore only such limitations should be imposed as are indicated in the appended claims.

I claim:

1. In the protection of ferrous metal from the corrosive effect of aqueous solutions which tend to substantially corrode the surfaces of said ferrous material contacted thereby, the steps which comprise incorporating within said aqueous solutions a small amount of zinc chromate and thereafter maintaining said ferrous metal surfaces wet by contact with such solution for an extended period of time.

2. The method according to claim 1 wherein the concentration of zinc chromate incorporated in said solution is substantially less than that of the saturation concentration of zinc chromate in said solution.

3. The method according to claim 1, including treatment of the aqueous solution with a soluble cadmium salt.

4. The method according to claim 1 wherein the concentration of zinc chromate in said solution is in the range of about 5–20 parts per million.

5. In the process wherein a corrosive aqueous solution is continuously passed through a tube having inner surfaces composed of ferrous metal, said solution passing in contact with and wetting said inner surfaces and normally having a substantial detrimental corrosive effect thereon, the steps which comprise incorporating within said aqueous solution prior to contact with said surfaces a small amount of zinc chromate and thereafter maintaining said surfaces wet with said zinc chromate solution, thereby avoiding the aforesaid corrosion.

6. The method according to claim 5 wherein said corrosive aqueous solution comprises a liquid stream of a sub-surface brine and about 5–20 parts per million of said zinc chromate are continuously introduced therein.

7. In the process wherein an acidic, aqueous, corrosive solution is continuously passed through a tube having inner surfaces composed of ferrous metal, said solution passing in contact with and wetting said inner surfaces and having a pH of below about 5.0 with a resulting corrosive effect thereon, the steps which comprise incorporating within said solution prior to contact with said surfaces a small amount of zinc chromate, supplementing said addition with a substantial amount of a more soluble chromate salt of the class consisting of the alkali and alkaline earth metal chromates to supply additional chromate ions in the acid environment, and maintaining said surfaces wet with said zinc chromate solution thereby avoiding the aforesaid corrosion.

8. In the process of claim 5, incorporating said zinc chromate in said solution by dissolving solid zinc chromate therein.

9. In the process of claim 5, incorporating said zinc chromate in said solution by causing said solution to percolate over a bed of zinc chromate.

10. In the process of claim 5, incorporating said zinc chromate in said corrosive solution by first forming a solution of zinc chromate in water, and then injecting said concentrated solution gradually into said corrosive solution.

11. In the process of claim 5, incorporating said zinc chromate in said corrosive solution by introducing therein readily soluble zinc and chromate compounds reactive with one another to form zinc chromate in said corrosive solution.

References Cited in the file of this patent

UNITED STATES PATENTS

| Number | Name | Date |
| --- | --- | --- |
| 987,965 | Cushman | Mar. 28, 1911 |
| 1,555,927 | Morris | Oct. 6, 1925 |
| 1,899,314 | Culmer | Feb. 28, 1933 |
| 2,064,325 | Sutton et al. | Dec. 15, 1936 |

OTHER REFERENCES

Eilerts et al., "Field and Laboratory Tests and Sodium Chromates and Alkalies," World Oil, July 1949, page 142.